(12) United States Patent
Iyer et al.

(10) Patent No.: US 11,513,886 B2
(45) Date of Patent: Nov. 29, 2022

(54) SYSTEM AND COMPUTER-IMPLEMENTED METHOD FOR MANAGING ROBOTIC PROCESS AUTOMATION (RPA) ROBOTS

(71) Applicant: UiPath, Inc., New York, NY (US)

(72) Inventors: Kartik Iyer, Karnataka (IN); Kruthika Ravi, Seattle, WA (US); Eshwar Ganesan, Bangalore (IN); Priya Dubey, Bangalore (IN)

(73) Assignee: UiPath, Inc., New York, NY (US)

( * ) Notice: Subject to any disclaimer, the term of this patent is extended or adjusted under 35 U.S.C. 154(b) by 0 days.

(21) Appl. No.: 17/245,375

(22) Filed: Apr. 30, 2021

(65) Prior Publication Data
US 2022/0291990 A1  Sep. 15, 2022

(30) Foreign Application Priority Data
Mar. 11, 2021  (IN) .............................. 202111010338

(51) Int. Cl.
| | | |
|---|---|---|
| *G06F 11/00* | (2006.01) | |
| *G06F 11/07* | (2006.01) | |
| *G06N 20/00* | (2019.01) | |
| *B25J 9/16* | (2006.01) | |
| *G06F 11/34* | (2006.01) | |

(52) U.S. Cl.
CPC ........... *G06F 11/0793* (2013.01); *B25J 9/163* (2013.01); *B25J 9/1674* (2013.01); *G06F 11/3476* (2013.01); *G06N 20/00* (2019.01)

(58) Field of Classification Search
CPC ......... B25J 9/163; B25J 9/1674; G06N 20/00; G06F 11/0793; G06F 11/3476
USPC ........................................................ 714/1–57
See application file for complete search history.

(56) References Cited

U.S. PATENT DOCUMENTS

| | | | |
|---|---|---|---|
| 8,665,750 B2 * | 3/2014 | Ramachandran | H04W 24/04 370/254 |
| 10,735,522 B1 | 8/2020 | Sathianarayanan et al. | |
| 10,839,404 B2 | 11/2020 | Ramamurthy et al. | |
| 10,843,342 B2 | 11/2020 | Geffen et al. | |
| 2016/0096272 A1 * | 4/2016 | Smith | G05D 1/0088 700/255 |
| 2018/0107652 A1 | 4/2018 | Karov et al. | |

(Continued)

OTHER PUBLICATIONS

International Search Report & Written Opinion, dated Feb. 11, 2022, PCT Patent Application No. PCT/US21/56953.

*Primary Examiner* — Sarai E Butler
(74) *Attorney, Agent, or Firm* — LeonardPatel PC; Sheetal S. Patel; Michael A. Leonard, II

(57) ABSTRACT

A system for managing one or more robots is provided. The system is configured to resolve the one or more issues or faults that lead to failure of execution of one or more automation processes executed by the one or more robots. The system is configured to receive information of an issue associated with at least one robot of the one or more robots and further configured to obtain job log data, associated with the at least one robot, for the issue. The system is further configured to determine, using a trained machine learning model, a corrective action, and its associated confidence score for resolving the received issue, based on the job log data and an analysis performed by the trained machine learning model. Further, system performs the corrective action based on the confidence score and the analysis, for managing the one or more robots.

20 Claims, 8 Drawing Sheets

(56) References Cited

U.S. PATENT DOCUMENTS

| | | | |
|---|---|---|---|
| 2018/0203994 A1 | 7/2018 | Shukla et al. | |
| 2019/0050827 A1 | 2/2019 | Kuffner, Jr. et al. | |
| 2019/0155225 A1* | 5/2019 | Kothandaraman | G06N 3/006 |
| 2019/0265990 A1 | 8/2019 | Hall et al. | |
| 2019/0303779 A1 | 10/2019 | Briggle et al. | |
| 2019/0311120 A1* | 10/2019 | Jaenisch | G06F 21/554 |
| 2019/0321973 A1 | 10/2019 | Meier et al. | |
| 2019/0332508 A1* | 10/2019 | Goyal | G06F 11/302 |
| 2020/0065223 A1 | 2/2020 | Radhakrishnan et al. | |
| 2020/0180148 A1* | 6/2020 | S Nanal | G06F 11/0793 |
| 2020/0259701 A1* | 8/2020 | Povoa | G06F 11/0751 |
| 2020/0306970 A1* | 10/2020 | Latkar | G06F 11/0766 |
| 2021/0049169 A1* | 2/2021 | Wardell | G06F 16/355 |
| 2021/0358071 A1* | 11/2021 | Lin | G06T 7/20 |
| 2022/0036178 A1* | 2/2022 | Dimitriadis | G06N 3/0472 |
| 2022/0070279 A1* | 3/2022 | Pang | H04L 67/40 |

* cited by examiner

| Bot name | Process name | Error code | Error description | Confidence | Historical evidence |
|---|---|---|---|---|---|
| Avengers | PO | P001 | Selector error | 98% | Occured 23 times in last 2 months |
| Marvel | Receipting | R003 | CPU utilization | 66% | Occured 1 time since deployment |

FIG. 7

SYSTEM AND COMPUTER-IMPLEMENTED METHOD FOR MANAGING ROBOTIC PROCESS AUTOMATION (RPA) ROBOTS

CLAIM FOR PRIORITY UNDER 35 U.S.C. § 119

This application claims the benefit of Indian Patent Application No. 202111010338 filed Mar. 11, 2021. The subject matter of this earlier filed application is hereby incorporated by reference in its entirety.

FIELD

The present invention generally relates to robotic process automation (RPA), and more specifically, to managing one or more RPA robots.

BACKGROUND

RPA has been used to facilitate the proliferation of software automation due to its execution of relatively simple, repeatable tasks that exist in large numbers within an enterprise. RPA allows automation of simple tasks that were earlier done using manual user input to a computing system and are now being increasingly performed by software robots (or worker robots) using RPA tools.

However, there are few cases where the worker robots fail to perform an automation process correctly. For example, when a worker robot fails to perform the automation process, the end user (or a developer) is interrupted, and the developer then checks the execution logs of the worker robot to find an issue that caused the failure of the worker robot. Once the issue that caused the failure of the worker robot is identified, the developer tries to resolve the issue. The whole process of resolving the issue usually takes few hours.

Therefore, an alternative method that resolves issues, which cause failure of the worker robots, may be more beneficial.

SUMMARY

Certain embodiments of the present invention provide better and easy solutions to the problems and needs in the art that have not yet been fully identified, appreciated, or solved by current RPA technologies. For example, some embodiments of the present invention pertain to managing one or more worker robots and resolving issues causing the one or more worker robots to fail to perform the automation process. The term "worker robots" and "robots" may be used interchangeably throughout this document.

In an embodiment, a system for managing one or more robots in a Robotic Process Automation (RPA) environment is provided. The system includes memory configured to store a trained machine learning (ML) model and one or more computer-executable instructions. The system further includes at least one processor configured to execute the one or more computer-executable instructions to receive information of an issue associated with at least one robot of the one or more robots; and obtain job log data for the issue, wherein the job log data is associated with the at least one robot. The at least one processor is further configured to determine, using the trained ML model, a corrective action and a corresponding confidence score for resolving the received issue, wherein the determination is based on the job log data and perform the corrective action for managing the one or more robots depending on the confidence score.

In another embodiment, a method for managing one or more robots in a Robotic Process Automation (RPA) environment is provided. The method includes receiving information of an issue associated with at least one robot of the one or more robots; and obtaining job log data for the issue, wherein the job log data is associated with the at least one robot. The method further includes determining, using a trained machine learning (ML) model, a corrective action, and a corresponding confidence score based on the job log data, and performing the corrective action for managing the one or more robots depending on the confidence score.

In yet another embodiment, a computer program is embodied on a non-transitory computer-readable medium. The program is configured to cause at least one or more processors to receive information of an issue associated with at least one robot and obtain job log data for with the issue associated with the at least one robot. The program is further configured to cause the one or more processors to determine, using a trained machine learning model, a corrective action and a corresponding confidence score of the corrective action based on the obtained job log data. The program is further configured to cause the one or more processors to perform the corrective action for managing the at least one robot depending on the confidence score.

These and other advantages will be apparent to those of ordinary skill in the art by reference to the following detailed description and the accompanying drawings.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 7 illustrates table comprising exemplary information associated with one or more issues that occurred in one or more robots, according to an embodiment of the present invention.

DETAILED DESCRIPTION OF THE EMBODIMENTS

Figure 1:
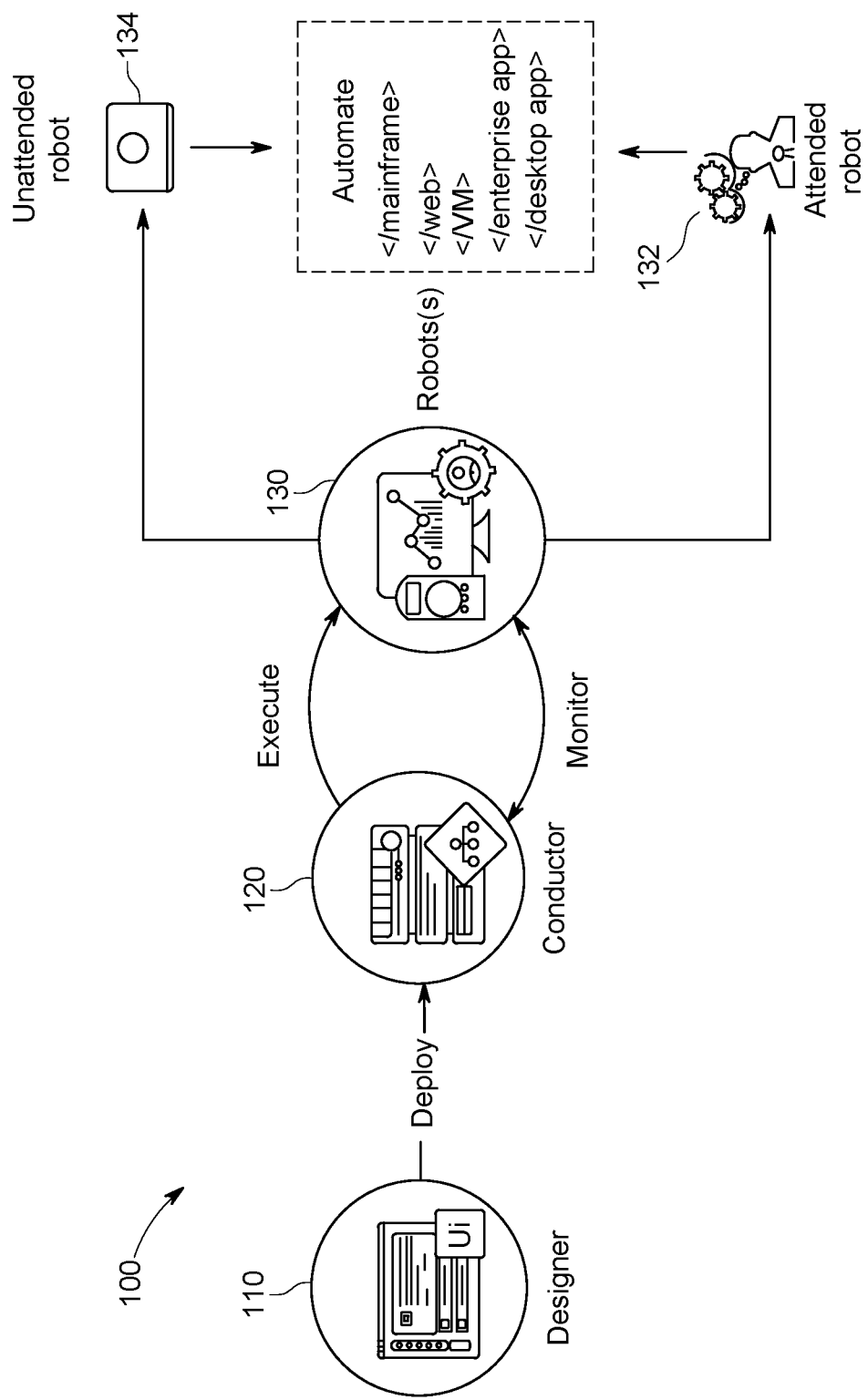
FIG. 1 is an architectural diagram illustrating an RPA system, according to an embodiment of the present invention.

Some embodiments pertain to a system (also referred as a "computing system") configured to manage one or more robots, where the one or more robots perform one or more automation processes. To that end, the one or more robots are monitored, and when any issue occurs in at least one robot that causes the at least one robot to fail to perform the one or more automation processes, information about the issue associated with the at least one robot is provided to the system. Further, job log data associated with the at least one robot for the issue is provided to the system. In some embodiments, the job log data is obtained by the system based on the information associated with the issue. The information associated with the issue may include information associated with an error in execution of a specific automation task performed by the at least one robot, information associated with failure of the at least one robot, name of the robot that encountered the issue, process running in the robot when the issue occurred, and the likes.

The system uses a trained ML model, such as a deep learning (DL) model, to predict a corrective action and a corresponding confidence score of the corrective action, based on the job log data, for the issue. The ML model is implemented using a neural network. The ML model is trained based on a training dataset comprising data associated with a plurality of historical issues, a plurality of historical job log data associated with the plurality of historical issues, corrective actions implemented for the plurality of historical issues, and the likes. Based on the training dataset, the ML model predicts the corrective action along with the corresponding confidence score to resolve the issue reported by the at least one robot. The confidence score indicates accuracy of the predicted corrective action for the reported issue. The corrective action is then performed in the at least one robot in order to resolve the issue based on the confidence score.

However, if the reported issue is a new issue and the ML model is not trained on the new issue, the system reports the error to a user, such as a developer. The developer then implements the corrective action for the issue. The newly implemented corrective action for the new issue is added to the training dataset of the system and the ML model is retrained based on new training dataset that includes such issues which were resolved by the user. The retraining updates the ML model and the next time when the same issue occurs the ML model resolves the issue automatically without human intervention. Thus, the ML model is implemented as a self-learning model, which leverages the concepts of reinforcement learning, to provide up-to-date, efficient, easy to implement and robust system for monitoring execution of the one or more robots in the RPA environment and also automatically fixing any issues that occur while execution of the one or more robots, without user intervention.

The system is also able to predict, using the ML model, one or more potential issues that might lead to one or more robots faulting in future and is able to optimize the execution of the one or more robots in such a way that occurrence of the one or more potential issues can be avoided. This in turn leads to cost and time saving, which would have otherwise been needed in conventional methods to fix the issues associated with the one or more robots.

In conventional methods, the developer is interrupted every time any worker robot fails at which point the developer has to check execution logs of the worker robot at fault, find the cause behind the failure of that worker robot, and once the cause behind the failure is identified fix the failure. The whole process of resolving the issue that caused the worker robot to fail from executing one or more automation task usually takes a few hours. Some embodiments propose a system that is trained to resolve all such issues, which cause worker robots to fail, by intelligently analyzing the issue and fixing the issue automatically without any human intervention. Further, the system is trained periodically for new issues (using the self-learning ML model) that may cause the execution of the worker robot to fail. Thus, over a period of time the system becomes highly accurate and intelligent enough to find and fix the issues automatically, without user intervention. Therefore, some embodiments provide a cost effective and an efficient method to manage one or more robots in an RPA system.

FIG. 1 is an architectural diagram illustrating an RPA system 100, according to an embodiment of the present invention. RPA system 100 includes a designer 110 that allows a developer or a user to design and implement workflows, different automation processes, and monitoring of the different automation processes. Designer 110 provides a solution for application integration, as well as automating third-party applications, administrative Information Technology (IT) tasks, and business IT processes. Designer 110 further facilitates development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™ Each activity includes an action, such as clicking a button, reading a file, writing to a log panel, etc. In some embodiments, workflows is nested or embedded.

Some types of workflows include, but are not limited to, sequences, flowcharts, Finite State Machines (FSMs), and/or global exception handlers. Sequences are particularly suitable for linear processes, enabling flow from one activity to another without cluttering a workflow. Flowcharts are particularly suitable to more complex business logic, enabling integration of decisions and connection of activities in a more diverse manner through multiple branching logic operators. FSMs are particularly suitable for large workflows. FSMs use a finite number of states in their execution, which can be triggered by a condition (i.e., transition) or an activity. Global exception handlers are particularly suitable for determining workflow behavior when encountering an execution error and for debugging processes.

Once a workflow is developed in designer 110, execution of business processes is orchestrated by a conductor 120, which orchestrates one or more robots 130 that execute the workflows developed in designer 110. One commercial example of an embodiment of conductor 120 is UiPath Orchestrator™ Conductor 120 facilitates management of the creation, monitoring, and deployment of resources in an environment. Conductor 120 acts as an integration point with third-party solutions and applications. In an embodiment, conductor 120 is integrated with the web based user interface.

Conductor 120 manages a fleet of robots 130, connecting and executing robots 130 from a centralized point. Types of robots 130 that are managed include, but are not limited to, attended robots 132, unattended robots 134, development robots (similar to the unattended robots 134, but used for development and testing purposes), and nonproduction robots (similar to the attended robots 132, but used for development and testing purposes). The attended robots 132 are triggered by user events and operate alongside a human on the same computing system. The attended robots 132 are used with conductor 120 for a centralized process deployment and logging medium. Attended robots 132 help a human user accomplish various tasks, and are triggered by the user events. In some embodiments, processes are not started from conductor 120 on this type of robot and/or they do not run under a locked screen. In certain embodiments, attended robots 132 are started from a robot tray or from a command prompt. Attended robots 132 run under human supervision in some embodiments.

The unattended robots 134 run unattended in virtual environments and automate many processes. Unattended robots 134 are responsible for remote execution, monitoring, scheduling, and providing support for work queues. Debugging for all robot types is run in designer 110 in some embodiments. Both attended robots 132 and unattended robots 134 automate various systems and applications including, but not limited to, mainframes, web applications, Virtual machines (VMs), enterprise applications (e.g., those produced by SAP®, SalesForce®, Oracle®, etc.), and computing system applications (e.g., desktop and laptop applications, mobile device applications, wearable computer applications, etc.).

Conductor 120 has various capabilities including, but not limited to, provisioning, deployment, configuration, queueing, monitoring, logging, and/or providing interconnectivity. Provisioning includes creating and maintenance of connections between robots 130 and conductor 120 (e.g., a web application). Deployment includes assuring the correct delivery of package versions to the assigned robots 130 for execution. Configuration includes maintenance and delivery of robot environments and process configurations. Queueing includes providing management of queues and queue items. Monitoring includes keeping track of robot identification data and maintaining user permissions. Further, the monitoring includes determining whether there is any issue with robots being monitored and resolving the issue when the issue occurs. The monitoring further includes predicting occurrence of the issue in the robots being monitored and optimizing execution of the robots in order to prevent the occurrence of the issue altogether. Logging includes storing and indexing logs to a database (e.g., an SQL database) and/or another storage mechanism (e.g., ElasticSearch®, which provides an ability to store and quickly query large datasets). Conductor 120 provides interconnectivity by acting as the centralized point of communication for the third-party solutions and/or applications.

Robots 130 can be execution agents that run workflows built in designer 110. One commercial example of some embodiments of the robot(s) 130 is UiPath Robots™. In some embodiments, robots 130 install the Microsoft Windows® Service Control Manager (SCM)-managed service by default. As a result, robots 130 can open interactive Windows® sessions under the local system account, and have rights of a Windows® service.

In some embodiments, robots 130 are installed in a user mode. For such robots 130, this means they have the same rights as the user under which a given robot 130 has been installed. This feature is also available for High Density (HD) robots, which ensure full utilization of each machine at its maximum potential. In some embodiments, any type of robots 130 can be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between the conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. The user mode robot services can be trusted with and manage the credentials for robots 130. A Windows® application is automatically launched if the SCM-managed robot service is not installed. In some embodiments, a healer robot (or a doctor robot) client service is implemented, where the healer robot client service provides monitoring of one or more robots (for example robots 130) deployed to execute one or more automation processes at a client side. The healer robot client service may be implemented as a software application in a system that monitors the one or more robots Executors run given jobs under a Windows® session (i.e., they may execute workflows). The executors are aware of per-monitor dots per inch (DPI) settings. Agents could be Windows® Presentation Foundation (WPF) applications that display the available jobs in the system tray window. The agents could be a client of the service. The agents request to start or stop jobs and change settings. The command line is a client of the service. The command line is a console application that requests to start jobs and waits for their output.

Having components of robots 130 split as explained above helps developers, support users, and computing systems more easily run, identify, and track what each component is executing. Special behaviors can be configured per component this way, such as setting up different firewall rules for the executor and the service. The executor is always aware of the DPI settings per monitor in some embodiments. As a result, the workflows can be executed at any DPI, regardless of the configuration of the computing system on which they were created. Projects from designer 110 can also be independent of a browser zoom level in some embodiments. For applications that are DPI-unaware or intentionally marked as unaware, DPI is disabled in some embodiments.

Figure 2:
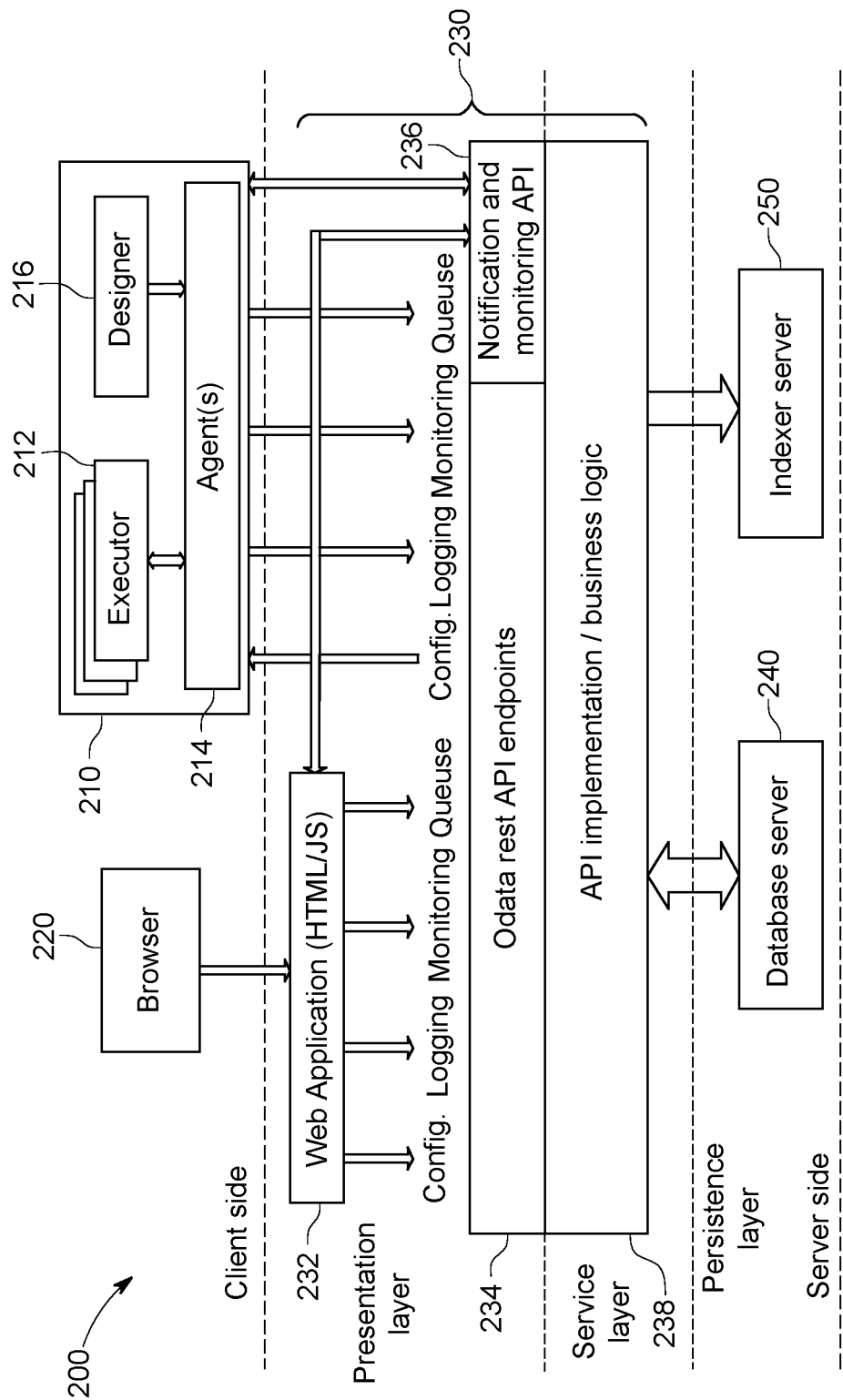
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may not be a part of, RPA system 100 of FIG. 1. It should be noted that a client side, a server side, or both, may include any desired number of the computing systems without deviating from the scope of the invention. On the client side, a robot application 210 includes executors 212, an agent 214, and a designer 216 (for instance, the designer 110). However, in some embodiments, the designer 216 is not running on the robot application 210. The executors 212 are running processes. Several business projects (i.e., executors 212) run simultaneously, as shown in FIG. 2. Agent 214 (e.g., the Windows® service) is the single point of contact for all executors 212 in this embodiment. All messages in this embodiment are logged into a conductor 230, which processes them further via a database server 240, an indexer server 250, or both. As discussed above with respect to FIG.

1, executors 212 are robot components which may be associated with one or more robots designed for specific tasks.

In some embodiments, a robot represents an association between a machine name and a username. The robot manages multiple executors at the same time. On computing systems that support multiple interactive sessions running simultaneously (e.g., Windows® Server 2012), there multiple robots are running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 opens a WebSocket channel that is later used by conductor 230 to send commands to the robot (e.g., start, stop, etc.).

On the server side, a presentation layer (a web application 232, an Open Data Protocol (OData) Representative State Transfer (REST) Application Programming Interface (API) endpoints 234, and a notification and monitoring API 236), a service layer (an API implementation/business logic 238), and a persistence layer (the database server 240 and the indexer server 250) are included. Conductor 230 may include web application 232, the OData REST API endpoints 234, the notification and monitoring API 236, and the API implementation/business logic 238. In some embodiments, most actions that a user performs in an interface of conductor 230 (e.g., via a browser 220) are performed by calling various APIs. Such actions include, but are not limited to, starting jobs on robots, adding/removing data in queues, scheduling jobs to run unattended, determining one or more issues associated with at least one robot from the one or more robots etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user creates robot groups, assign packages to the robots, analyze logs per robot and/or per process, start and stop robots, etc.

In addition to web application 232, conductor 230 also includes service layer that exposes the OData REST API endpoints 234. However, other endpoints may be included without deviating from the scope of the invention. The REST API is consumed by both web application 232 and agent 214. The agent 214 is the supervisor of the one or more robots on the client computer in this embodiment.

The REST API in this embodiment covers configuration, logging, monitoring, and queueing functionality. The configuration endpoints are used to define and configure application users, permissions, robots, assets, releases, and environments in some embodiments. Logging REST endpoints are used to log different information, such as errors, explicit messages sent by the robots, and other environment-specific information, for instance. Deployment REST endpoints are used by the robots to query the package version that should be executed if the start job command is used in conductor 230. Queueing REST endpoints are responsible for queues and queue item management, such as adding data to a queue, obtaining a transaction from the queue, setting the status of a transaction, etc.

Monitoring REST endpoints monitor web application 232 and agent 214. The notification and monitoring API 236 could be REST endpoints that are used for registering agent 214, delivering configuration settings to agent 214, and for sending/receiving notifications from the server and agent 214. The notification and monitoring API 236 also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 manages queues and queue items. In some embodiments, database server 240 stores messages logged by the robots (in addition to or in lieu of indexer server 250).

Indexer server 250, which is optional in some embodiments, stores and indexes the information logged by the robots. In certain embodiments, indexer server 250 could be disabled through the configuration settings. In some embodiments, indexer server 250 uses ElasticSearch®, which is an open source project full-text search engine. The messages logged by robots (e.g., using activities like log message or write line) are sent through the logging REST endpoint(s) to indexer server 250, where they are indexed for future utilization.

Figure 3:
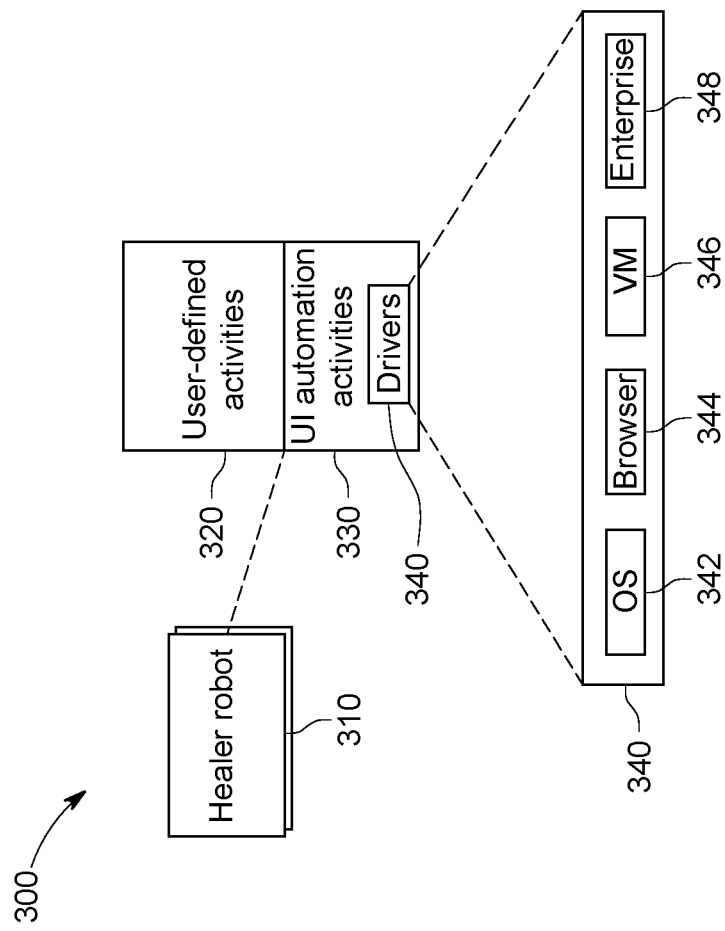
FIG. 3 is an architectural diagram illustrating a relationship between a healer robot user-defined activities, User Interface (UI) automation activities, and drivers, according to an embodiment of the present invention.

FIG. 3 is an architectural diagram illustrating a relationship 300 between a healer robot 310, user-defined activities 320, User Interface (UI) automation activities 330, and drivers 340, according to an embodiment of the present invention. Per the above, a developer uses healer robot 310 to monitor one or more robots (not shown in FIG. 3), to determine whether any robot has any issue, report the issue to a trained ML model (not shown in FIG. 3), and implement a corrective action provided by the trained ML learning model. To that end, healer robot 310 includes a system for monitoring one or more robots for identifying any live or potential faults that might occur with at least one robot. Hereinafter, terms healer robot 310 and system for monitoring the one or more robots, may be used interchangeably without deviating from the scope of the present invention.

Each robot of the one or more robots implements workflows. The workflows include user-defined activities 320 and UI automation activities 330. Some embodiments are able to identify non-textual visual components in an image associated with the workflows, which is called computer vision (CV) herein. Some CV activities pertaining to such components may include, but are not limited to, click, type, get text, hover, element exists, refresh scope, highlight, etc. The click in some embodiments identifies an element using CV, optical character recognition (OCR), fuzzy text matching, and multi-anchor, for example, and clicks it. The type identifies an element using the above and types in the element. The get text identifies the location of specific text and scan it using the OCR. The hover identifies an element and hover over it. The element exists checks whether an element exists on the screen using the techniques described above. In some embodiments, there may be hundreds or even thousands of activities that may be implemented in user defined activities 320 component. However, any number and/or type of activities may be available without deviating from the scope of the invention.

UI automation activities 330 are subset of special, lower level activities that are written in lower level code (e.g., CV activities) and facilitate interactions with the screen. In some embodiments, UI automation activities 330 include activities, which are related to debugging flaws or correcting flaws in the workflows. UI automation activities 330 facilitate these interactions via the drivers 340 that allow the robot to interact with the desired software. For instance, the drivers 340 include Operating System (OS) drivers 342, browser drivers 344, VM drivers 346, enterprise application drivers 348, etc.

Drivers 340 are configured to interact with OS drivers 342 at a low level looking for hooks, monitoring for keys, etc. They may facilitate integration with Chrome®, IE®, Citrix®, SAP®, etc. For instance, the "click" activity performs the same role in these different applications via drivers 340. Drivers 340 may enable execution of an RPA application in an RPA system. Browser drivers 344 include a web-based user interface for a user or developer to interact.

Figure 4:
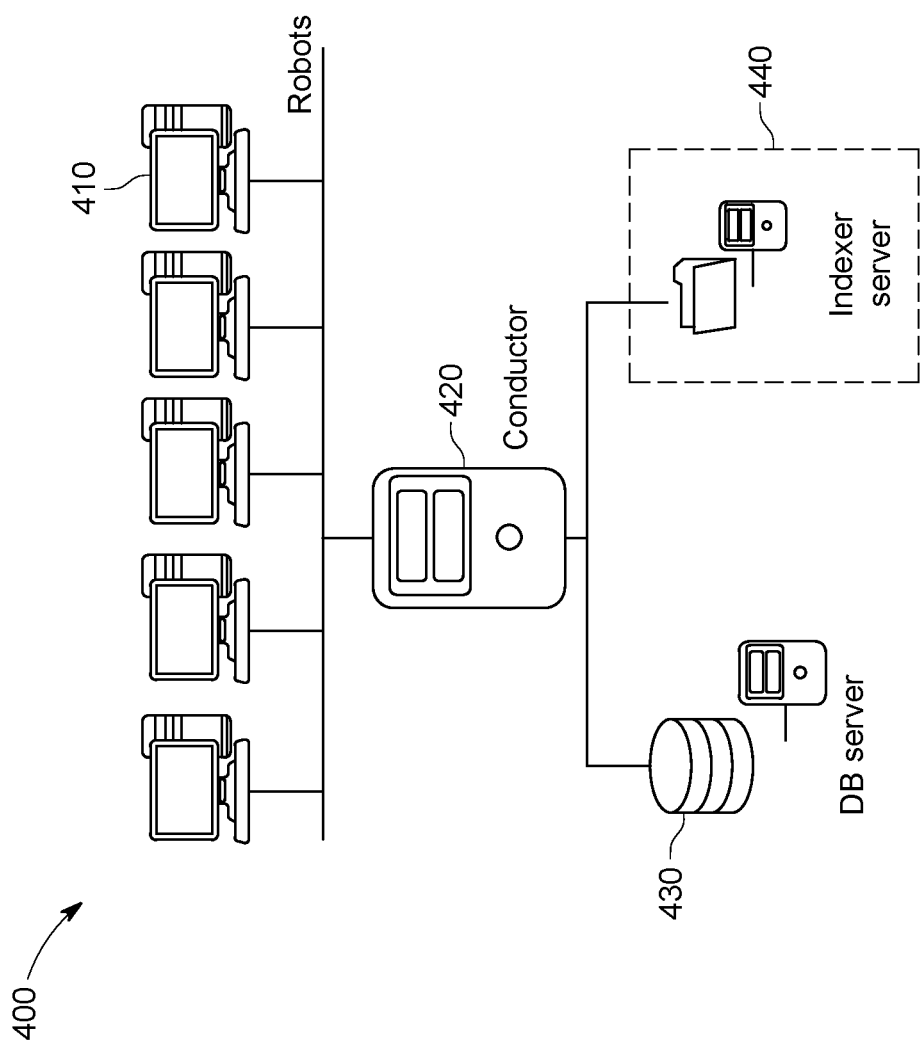
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 (for instance, running robots). Multiple client computing systems 410 may be configured to automate one or more processes at the client end. Multiple client computing systems 410 are further configured to communicate with a conductor computing system 420 via a web application running thereon. Conductor computing system 420, in turn, is configured to communicate with a database server 430 (for instance, the database server 240) and an optional indexer server 440 (for instance, the optional indexer server 250).

With respect to the FIGS. 1 and 3, it should be noted that while the web application is used in these embodiments, any suitable client/server software may be used without deviating from the scope of the invention. For instance, the conductor may run a server-side application that communicates with non-web-based client software applications on the client computing systems. Additionally, the conductor may be a part of cloud based architecture for implementing the various embodiments of the present invention.

Figure 5:
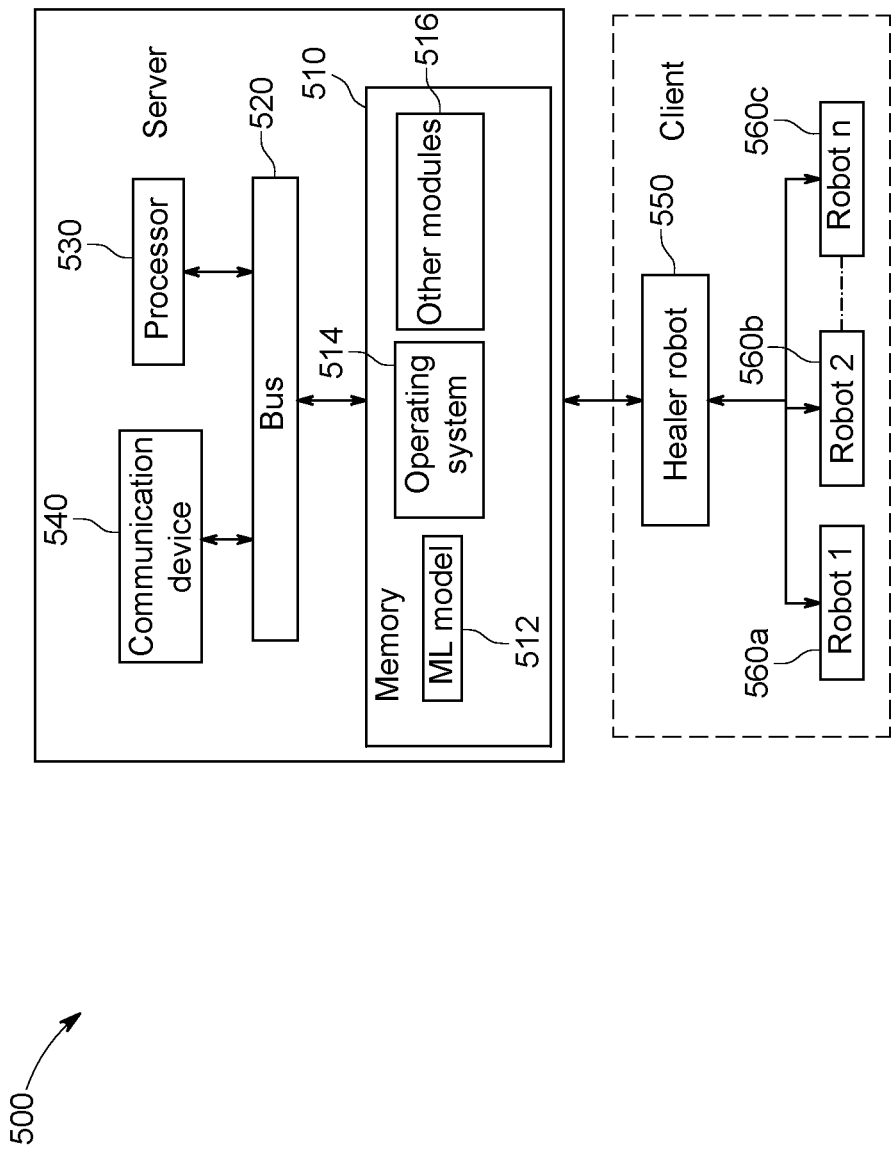
FIG. 5 is a block diagram illustrating an RPA system for managing one or more robots, according to an embodiment of the present invention.

FIG. 5 is a block diagram illustrating an RPA system 500 for monitoring one or more robots 560a, 560b, and 560c, according to an embodiment of the present invention. System 500 is configured to rectify one or more issues occurring in at least one robot of the one or more robots 560a, 560b, and 560c. To that end, system 500 obtains information about the one or more issues associated with the at least one robot of the one or more robots 560a, 560b, and 560c being monitored, and further determines at least one corrective action with a corresponding confidence score to resolve the one or more issues. The determined corrective action may be implemented at the robot, such as any of one or more robots 560a, 560, and 560c, which is at fault, in order to resolve the issue automatically without any human intervention. However, in case system 500 is unable to determine a corrective action for the one or more issues, system 500 may inform the end user, such as the developer, about the one or more issues, and the developer may implement the corrective action itself. Further, system 500 may learn from the newly implemented corrective action and use the learning to retrain a trained ML model, such as ML model 512 stored in a memory 510 associated with system 500.

System 500 includes memory 510 configured to store one or more computer-executable instructions to be executed by a processor 530. Memory 510 may include of any combination of Random Access Memory (RAM), Read Only Memory (ROM), flash memory, cache, static storage such as a magnetic or optical disk, or any other types of non-transitory computer-readable media or combinations thereof. The non-transitory computer-readable media may be any available media that may be accessed by processor(s) 530 and may include volatile media, non-volatile media, or both. The media may also be removable, non-removable, or both.

Further, processor 530 can be a single core processor, a multi-core processor, a computing cluster, or any number of other configurations. Processor 530 is coupled with the memory 510 via a bus 520.

System 500 further includes a communication device 540, such as a transceiver, to provide access to a communications network via a wireless and/or wired connection. In some embodiments, communication device 540 is configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 540 includes one or more antennas that are singular, arrayed, phased, switched, beamforming, beam steering, a combination thereof, and or any other antenna configuration without deviating from the scope of the invention.

Further, memory 510 is configured to store the trained ML model 512. ML model 512 may be implemented using deep learning capabilities, such as using a neural network. Memory 510 stores other modules 516 that provide functionality when executed by processor(s) 530. Other modules 516 may include an operating system 514 for system 500. However, in some embodiments, operating system 514 is not part of other modules 516 and is implemented as a stand-alone unit, as depicted in system 500 of FIG. 5 for exemplary purpose.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to emphasize their implementation independence more particularly. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code, for instance, includes one or more physical or logical blocks of computer instructions that, for instance, are organized as an object, procedure, or function. Nevertheless, the executables of an identified module need not be physically located together, but may include disparate instructions stored in different locations that, when joined logically together, include the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set or may be distributed over different locations including over different storage devices, and may exist, at least partially, merely as electronic signals on a system or network.

System 500 may be implemented at the server end. In some embodiments, system 500 is implemented in at least one of a cloud environment or an on-premises environment (i.e., at a client location). Further, system 500 is implemented to monitor the one or more robots 560*a*, 560*b*, and 560*c* at the client end in order to determine occurrence of any issue and further resolving the issue using ML model 512. To that end, the ML model 512 is trained based on training dataset comprising data associated with at least a plurality of historical issues, resolution data associated with a plurality of historical corrective actions corresponding to the plurality of historical issues, and a plurality of job logs. Based on the training data the ML model 512 predicts a corrective action to resolve any issue that has caused failure of any of the robots 560*a*, 560*b*, and 560*c*.

Further, to monitor the one or more robots, system 500 is in direct communication with a healer robot 550 (also referred to as doctor Robot or Dr. Robot). Healer robot 550 may be implemented as a software application that provides a client service such as monitoring a plurality of robots, for example a robot 1-560*a*, a robot 2-560*b*, and a robot n-560*c*. Healer robot 550 identifies any live or potential faults that might occur with at least one robot of the plurality of robots 560*a*-560*c*. Further, healer robot 550 ensures deployment of a corrective action in the at least one robot with any faults. System 500 may use communication device 540 to directly communicate with healer robot 550. Each robot of the plurality of robots 560*a*-560*c* is configured to execute one or more automation processes such as reading mails, filling forms, downloading attachments in a mail to a desired folder, or the likes.

In order to monitor the one or more robots 560*a*-560*c* and to further resolve one or more issues occurring in at least one robot of one or more robots 560*a*-560*c*, processor 530 is configured to execute the one or more computer executable instructions to receive information of an issue associated with at least one robot of the plurality of robots 560*a*-560*c*. The information of the issue may include information associated with an error in execution of a specific automation task performed by the at least one robot, information associated with failure of the at least one robot, or the likes. System 500 receives the information of the issue associated with the at least one robot of one or more robots 560*a*-560*c* from healer robot 550 monitoring one or more robots 560*a*-560*c*.

Further, processor 530 is configured to obtain job log data associated with the at least one robot for the received issue, where the job log data may include information associated with an ongoing process in the at least one robot with the issue. For example, if healer robot 550 identifies that robot 560*a* has encountered an issue, healer robot 550 provides information associated with the robot that encountered the issue to trained ML model 512. The information may include name of the robot, e.g., robot 560*a*, that encountered the issue and a process running in robot 560*a*. Based on the provided information trained ML model 512 obtains job log data associated with robot 560*a*, which encountered the issue. The job log data may be stored in one or more databases. Trained ML model 512 may communicate directly with the one or more databases to obtain the job log data associated with robot 560*a*.

The job log data is obtained by (or provided to) trained ML model 512 of system 500, where trained ML model 512 determines a corrective action and an associated confidence score for resolving the received issue, based on the job log data. The job log data is analyzed by trained ML model 512 in order to determine the corrective action with the corresponding associated confidence score. The confidence score indicates accuracy of the corrective action predicted by system 500 to resolve the issue in the at least one robot (such as robot 560*a*). System 500 may further store the information associated with the issue and the corresponding corrective action with the confidence score in memory 510 and may be provide this stored data to a user of system 500. In another embodiment, the information associated with the issue and the corresponding corrective action with the confidence score may be periodically provided to the user. Further, the determined corrective action is performed in the at least one robot to resolve the issue in the at least one robot based on the confidence score. For example, if the confidence score is more than a threshold confidence score, the corrective action is performed. However, if the confidence score is lesser than the threshold confidence score, an alternate action may be performed. The alternate action may be selected from any of interrupting a user to resolve the issue, stopping execution of system 500 till the issue is resolved, recording information about the issue and its determined issue in memory 510, presenting information about the issue and the confidence score and the suggested fix to the user on a user interface and the like.

To that end, system 500 may transmit the determined corrective action with the confidence score to healer robot 550. Healer robot 550, based on the confidence score, automatically implements the corrective action in the at least one robot and resolves the issue in the at least one robot without human intervention, as discussed above.

In some embodiments, the trained ML model 512 is configured to predict a plurality of corrective actions, with corresponding confidence scores, for an issue occurred in the at least one robot of one or more robots 560a-560c. The confidence scores corresponding to the predicted corrective actions are compared with the threshold confidence score. The threshold confidence score may be a predetermined value, for example 95%. In some embodiments, the threshold confidence score may be defined by the user. Value of the threshold confidence score may depend on the application. For example, a threshold confidence score value for implementing a corrective action to resolve an issue in an automation process associated with a medical application will be higher than a threshold confidence score value for implementing a corrective action to resolve an issue in an automation process associated with image detection application.

For example, a robot is configured to execute an automation process of selecting a drug from a plurality of drugs that should be given to a patient based on the patient's symptoms of a disease. Assume that the robot meets an issue in selecting a drug based on a new symptom on which the robot is not trained to select a drug and the robot may raise a flag for the issue. In this case, healer robot 550 determines the issue and sends information associated with the issue to trained ML model 512. The healer robot 550 may also send information associated with the robot that encountered the issue to trained ML model 512. The information associated with the robot may include name of the robot with the issue and process running in the robot. Based on the information associated with the robot, trained ML model 512 obtains job log data associated with the issue from a database that stores job log data of all robots being monitored. Trained ML model 512 may analyze the job log data and determine a plurality of drugs with confidence scores corresponding to each drug that may be given to the patient for the given symptoms. In this case corrective action corresponds to determination of a correct drug that must be given to the patient for the given symptoms. Further, ML model 512 compares confidence scores corresponding to plurality of drugs that may be given to the patient with a threshold confidence score. The value of this threshold confidence score should be high, for example 98%-99%, so that based on the comparison the accurate drug is provided to the patient which do not cause any side effects to the patient. If the threshold confidence score is not kept high for the medical application, it is possible that less accurate drug may be provided to the patient which may result in casualties.

Additionally, or alternatively, the value of the threshold confidence score may also depend on the issue occurred in the at least one robot that is desired to be resolved using the corrective action.

Trained ML model 512 is further configured to determine at least one corrective action with corresponding confidence score more than the threshold confidence score. The determined corrective action along with the corresponding confidence score is provided to healer robot 550, where healer robot 550 implements the determined corrective action in the at least one robot to resolve the issue. Further, in case a plurality of corrective actions have their confidence score more than the threshold confidence score, trained ML model 512 is configured to select the corrective action from the plurality of corrective actions with highest confidence score.

In an example embodiment, system 500 provides the plurality of corrective actions with their corresponding associated confidence scores to healer robot 550. Healer robot 550 may compare the confidence scores corresponding to the plurality of corrective actions with the threshold confidence score. Further, based on the comparison healer robot 550 may implement, automatically, the corrective action with confidence score more than the threshold confidence score.

On the other hand, when the confidence scores corresponding to the plurality of corrective actions is less than the threshold confidence score, system 500 alerts the user. To that end, system 500 transmits information associated with the issue in the at least one robot to the user. The user may implement a new corrective action to resolve the issue. System 500 stores the new corrective action and use the new corrective action to retrain the trained ML model 512. Thus, the trained ML model 512 is a self-learning model.

In an example embodiment, a robot, such as any of robots 560a-560c, is configured to perform an automation process such as filling a form. To execute the automation process of filling the form the robot may be trained to click on a "Please Login Here" selector on a webpage. However, due to recent updates in interface of the webpage, the selector is changed to "Login Here". Therefore, robot fails to locate the selector as the robot is trained to select a selector stating, "Please Login Here" and thus, the robot flags an issue. The information associated with the issue, which is not being able to locate the correct selector here, is provided to a system (for example, system 500) via the healer robot 550 monitoring the robot. System 500 then uses trained ML model 512 to determine a corrective action for the issue, along with a corresponding confidence score. In this case, the corrective action may correspond to searching a selector stating words analogous to words in the selector "Please Login Here", for example searching "Login" or "Login Here". However, if trained ML model 512 fails to determine any corrective action, a user may be informed about the issue and the user implements a new corrective action. Based on the corrective action implemented by the user the system is retrained automatically.

In another embodiment, a corrective action corresponding to a confidence score more than the threshold confidence score may be provided to a user to approve or disapprove implementation of the corrective action. To that end, the user may be provided with approve and disapprove buttons by system 500. If the user approves the corrective action, the corrective action is implemented automatically. However, if the user decides to implement a new corrective action (other than the correction suggested by system 500), the user may click the disapprove button and implement the new corrective solution. System 500 is configured to retrain trained ML model 512 based on the new corrective action.

In some embodiments, system 500 predicts a potential issue associated with the at least one robot of the plurality of robots 560a-560c. To that end, system 500 may be configured to periodically obtain job log data associated with the plurality of robots 560a-560c and analyze the obtained job log data. Further, system 500 uses trained ML model 512 to predict the potential issue in the at least one robot based on the analysis of the job log data. Further, based on the predicted potential issue, execution of the at least one robot is optimized such that the potential issue is prevented from occurring. To that end, system 500 may provide operation optimization instruction to optimize execution of the at least one robot determined to develop the predicted potential issue to healer robot 550, and healer robot 550 may use the operation optimization instruction to optimize execution of the at least one robot.

For example, based on the periodically obtained job log data, trained ML model 512 determines that one of the robots at the client end may not be able to complete an automation process because the robot is predicted to overload its CPU and run out of RAM. In order to maintain continuous execution of the automation process in the robot, trained ML model 512 may optimize operation of the robot. To that end, trained ML model 512 may be configured to determine processes (other than the automation process) in the robot that are consuming more RAM and CPU and terminate or halt some non-essential processes executing in the robot in parallel with the automation process. Accordingly, healer robot 550 is provided with operational instructions to optimize the execution in the robot. Thus, trained ML model 512 is configured to foresee the issue and optimize execution of the robot automatically without human intervention in order to maintain smooth execution of the robot and to efficiently manage one or more robots using system 500.

Figure 6:
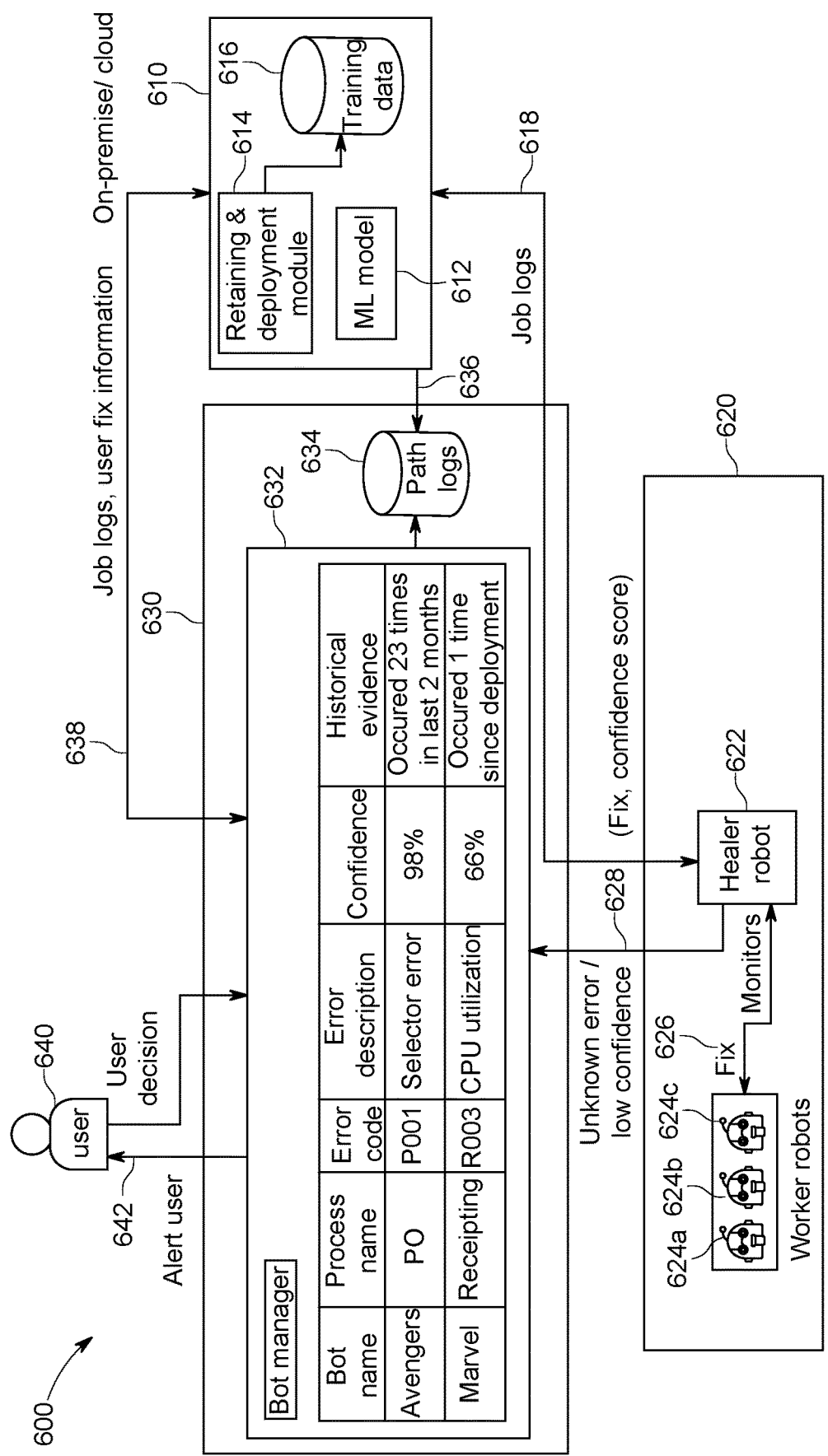
FIG. 6 is an architectural diagram illustrating implementation of a system for managing one or more robots, according to an embodiment of the present invention.

FIG. 6 is an architectural diagram 600 illustrating implementation of a system 610 for managing one or more robots 624a, 624b, and 624c, according to an embodiment of the present invention. The architectural diagram 600 provides relationship of system 610 to different components such as components at a client side 620 and a conductor (e.g., UiPath Orchestrator™) 630, which may be implemented at server side or client side, without limiting the scope of the embodiments described herein. Client side 620 includes a healer robot 622 (or Dr. Robot) (analogous to healer robot 550 illustrated in FIG. 5) configured to monitor worker robots or one or more robots 624a, 624b, and 624c. Healer robot 622 may be a software application that provides a client service such as monitoring a plurality of robots. Healer robot 622 identifies any live or potential faults that might occur with at least one robot of the one or more robots 624a-624c and provides information associated with the issue to system 610. Further, healer robot 622 ensures deployment of a corrective action in the at least one robot with any faults. Healer robot 622 is in direct communication with system 610 and conductor 630. System 610 may be implemented in a cloud environment i.e., system 610 is remotely located. In an example embodiment, system 610 is implemented on-premises i.e., system 610 is implemented at client-side 620 itself. Further, conductor 630 provides a user interface to a user 640 (for example, a developer) to implement a workflow to manage robots 624a, 624b, and 624c. Conductor 630 enables user 640 to implement corrective action directly to resolve one or more issues that may have occurred at any of one or more robots 624a, 624b, and 624c.

Further, to resolve issues that may occur in one or more robots 624a, 624b, and 624c, the system 610 is configured to receive information associated with the issues. To that end, system 610 uses healer robot 622 to continuously monitor the robots 624a, 624b, and 624c. During monitoring of robots 624a, 624b, and 624c, when healer robot 622 determines an issue with at least one robot, say robot 624b, healer robot 622 sends 618 information associated with the determined issue to trained ML model 612. Further, healer robot 622 may send information associated with the robot 624b such as name of the robot 624b, process running at the robot 624b when the issue occurred, or the like. Based on the provided information the trained ML model 612 obtains job log data, associated with the robot that encountered the issue (robot 624b), from a path logs database 634. Path logs database 634 is a database implemented in conductor 630 that may store job log data associated with all the robots 624a-624c being monitored.

On obtaining the job log data, trained ML model 612 analyzes the obtained job log data and the information associated with the issue occurred in robot 624b. Further, trained ML model 612 is configured to predict at least one corrective action to be taken in order to resolve or fix the issue. ML model 612 based on its training data 616 and retraining and deployment module 614 predicts the at least one corrective action with a confidence score, which estimates accuracy of the corrective action predicted for the issue. In some embodiments, trained ML model 612 is configured to use conditional random field (CRF) approach to identify parts of speech from the obtained job log data. Using the identified parts of speech, keywords are identified, which are then used to train the ML model 612 to understand a sentiment associated with the job log data and the issue. Further, the identified sentiment understanding is then used to the fix the issue or to predict a corrective action for the issue.

System 610 sends 618 the predicted corrective action and the corresponding confidence score to healer robot 622 in order to perform the corrective action at robot 624b. Further, system 610 may store 636 information associated with issue such as issue name/identification code, corrective action or fix used to resolve the issue, name/identification code of the robot with the issue (in this case 624b), confidence score of the corrective action taken, and the likes in path logs database 634.

Further, system 610 sends 638 a log entry associated with fixing the issue in the robot 624b to conductor 630, where the log entry is added to a bot manager 632. Bot manager 632 is a management application that may be installed in conductor 630. Bot manager 632 maintains all previous and current log entries associated with all issues resolved by system 610 as well as unresolved issues. Bot manager 632 keeps log information such as name of a robot in which the issue occurred, process in which the issue occurred, error code associated with the issue, error description, confidence score of the corrective action taken by system 610, and the likes. A detailed analysis of log information stored by bot manager 632 is provided with respect to FIG. 7.

In some embodiment, system 610 predicts a plurality of corrective actions with corresponding confidence scores to resolve the issue. System 610 compares confidence scores corresponding to each of the predicted corrective action with a threshold confidence score. Based on the comparison, system 610 determines a corrective action, from the plurality of corrective actions, with a confidence score more than the threshold confidence score. System 610 then sends the determined corrective action with the confidence score to healer robot 622.

Healer robot 622 implements 626 the corrective action, provided by system 610, in robot 624b without any human intervention and thus, is configured to fix the issue in robot 624b, automatically.

On the other hand, it is possible that the issue that occurred in robot 624b is a new issue and the ML model 612 is not trained to resolve this issue. Thus, system 610 is either unable to predict any corrective action or predict a corrective action with a low confidence score. In either case, the issue is unresolved and healer robot 622 provides 628 the information associated with the unresolved issue to conductor 630. Conductor 630 adds the information associated with the unresolved issue in bot manager 632. Bot manager 632 alerts 642 user 640 regarding the unresolved issue. Bot manager 632 further transmits information associated with the unresolved issue, determined corrective action for the unresolved issue and corresponding confidence score to user 640. The information associated with the unresolved issue may include such as name of the at least one robot in which the issue occurred, a process that was running in the at least one robot when the issue occurred, a code associated with the issue, a description of the issue, confidence score associated with a corrective action suggested by system 610 (e.g., where system 610 has suggested a corrective action but with a low confidence score), and historical occurrence data of the issues. In some embodiments, the information associated with the unresolved issue is presented to user 640 on a user interface.

Further, bot manager 632 may provide an option to user 640 to either approve or disapprove the corrective actions with low confidence score, such as by providing one or more buttons along with the issue information, on the user interface. If user 640 approves the corrective action suggested by system 610, the approval is sent 638 to system 610. System 610 may send 618 the approved corrective action with corresponding confidence score to healer robot 622. Healer robot 622 implements the approved corrective action in robot 624b and resolves the issue.

However, if user 640 disapproves the corrective actions suggested by system 610 or system 610 has not suggested any corrective action, user 640 can manually implement a new corrective action. The new corrective action implemented by user 640 is then added to training data database 616. Further, retraining and deployment module 614 may use the new corrective action added in the training data database 616 to retrain ML model 612 automatically. ML model 612 may be retrained periodically as per a predetermined schedule. Retraining the ML model 612 periodically updates the ML model 612 with new corrective actions corresponding to new issues, and/or better corrective actions for the earlier issues.

In an example embodiment, a robot may stop executing an automation process due to package/dependency issues, where some of the dependencies required for executing a process might work well initially and stops working after a few days. These types of faults lead to the inappropriate working of the robot and the robot raises an error. These errors can be resolved by the developer by re-downloading those dependencies. The steps involved in auto-downloading are captured by the trained ML model 612 and/or healer robot 622 and learns how to resolve these issues in the future. Once, trained ML model 612 and/or healer robot 622 is trained, and the Package/Dependency issue occurs, the healer robot 622 can auto-download the dependencies automatically without human intervention.

Further, the information associated with the issue that occurred in at least one robot of the one or more robots may be used by a user to analyze the corrective action suggested by system 610 or the corrective actions taken by system 610 to resolve an issue. FIG. 7 illustrates table 700 comprising exemplary information associated with one or more issues that occurred in one or more robots, according to an embodiment of the present invention. FIG. 7 is described below in conjunction with FIG. 6. Table 700 stores information such as a name of a robot in which an error occurred, a process that was running, error code (or issue code) that identifies the issue uniquely, description of the issue that occurred, confidence score about a corrective action suggested/implemented by system 610, and historical evidence of the error (or issue). The information about the issue may be added in bot manager 632 by at least one of: healer robot 622 and system 610. Thus, bot manager 632 is an application (for example, the management application) stored in memory of system 610 where conductor 630 is installed. In table 700, a first entry 710 includes a robot named Avenger™ in which a process named PO was running when an issue or error with an error code P001 occurred. Further, first entry 710 includes description of the error occurred in the robot Avenger™ and a confidence score of 98% corresponding to a corrective action implemented by system 610. First entry 710 further includes historical evidence of occurrence of the error P001 such as the error with code P001 has occurred 23 times in the last 2 months. Similarly, a second entry 720 includes information such as a robot named Marvel™ in which a process named Receipting was running when an error with an error code R003 occurred. The error code R003 corresponds to an error associated with CPU utilization. Further, a confidence score of 66% corresponding to a corrective action that may be implemented or suggested by the system is provided along with historical evidence of the error R003 such as the error R003 has occurred 1 time since deployment. In some example embodiments, a threshold confidence score of 75% may be set for implementing a corrective action. Thus, in table 700, error in first entry 710 has a suggested fix with confidence score more than the threshold score of 75% and thus, the suggested fix or corrective action for error P001 in first entry 710 may be automatically fixed using corrective action provided by trained ML model 612. However, in second entry 720, the suggested fix has a confidence score of only 66%, which is lesser than the threshold score of 75% and thus, the suggested fix or corrective action for error R003 in second entry 710 cannot be automatically fixed using corrective action provided by trained ML model 612. In this case, a user may be alerted to manually resolve the error or issue.

Figure 8:
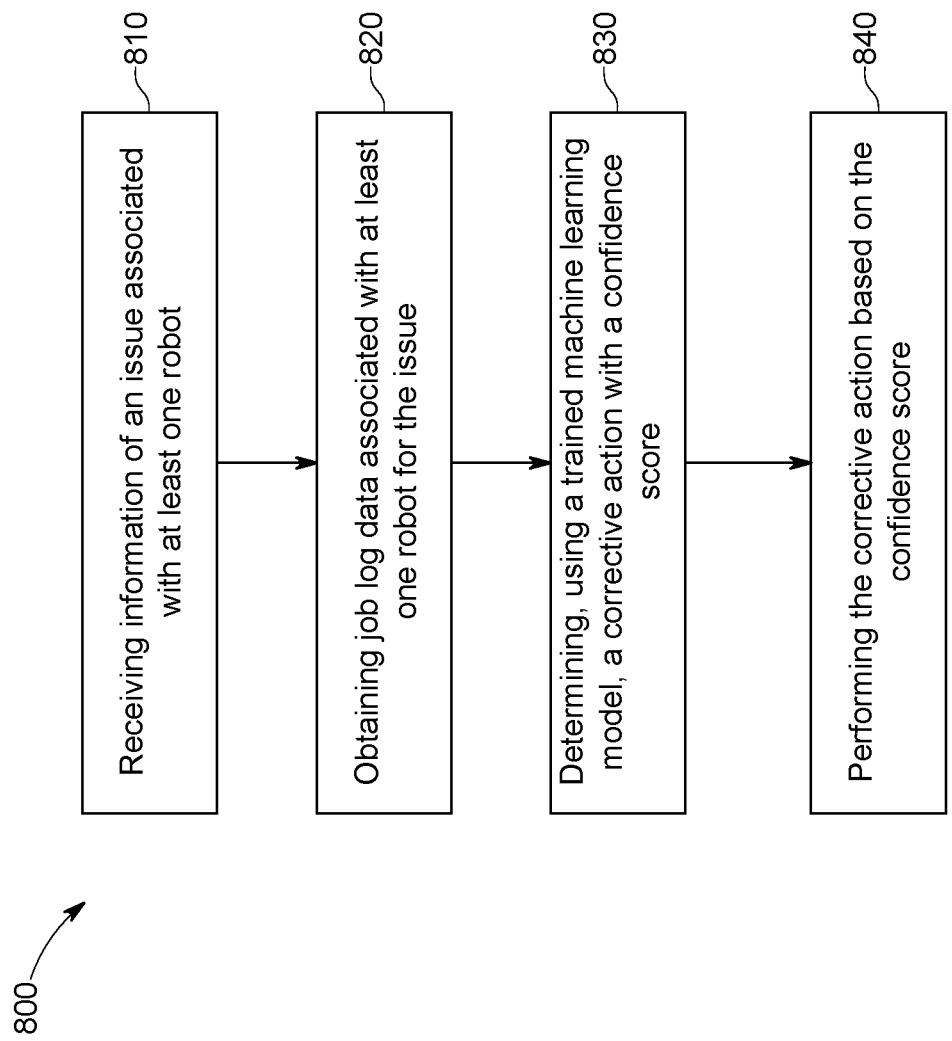
FIG. 8 is a flowchart illustrating a method for managing one or more robots, according to an embodiment of the present invention.

FIG. 8 is a flowchart illustrating a method 800 for managing one or more robots, according to an embodiment of the present invention. The one or more robots are configured to automate one or more tasks such as downloading attachments from a mail to a desired folders, filling forms, and the likes. The execution of the automation process performed by the one or more robots are affected due to many different issues. For example, the one or more robots may fail to execute an automation process in case of: timeout exceptions, selector not found exception, excel hangs due to a huge amount of data, CPU RAM usage, package/dependency issues—Auto-Download, machine slowness due to multiple processes running in the background, auto robot provisioning in case of the high input volume, or the likes. Method 800 provides steps to resolve one or more issues mentioned above automatically without human intervention. In order to achieve that, at step 810, information of an issue associated with at least one robot of the one or more robots is received. For example, the issue may prohibit the execution of a process (e.g., an automation process) running in the at least one robot. The information of the issue may include information such as name of a robot with issue, issue identification code, description of the issue, and the like.

At step 820, job log data associated with at least one robot that encountered the issue is obtained. The job log data may include information associated with the ongoing automation process in the at least one robot with the issue. The job log data may be obtained from a database (e.g., paths log database 634) that stores job log data associated with all the robots being monitored.

At step 830, a corrective action with a corresponding confidence score is determined using a trained ML model such as trained ML model 512 or trained ML model 612. To that end, the trained ML model analyzes the job log data associated with the issue to determine the corrective action and a corresponding confidence score. Further, the trained ML model compares the confidence score of the determined corrective action with a threshold confidence score value. If the confidence score is greater than the threshold confidence score value, the corresponding corrective action is implemented in the at least one robot with the issue. The corrective action is used to resolve the issue in the at least one robot. The trained ML model may be implemented using a DL model, such as using a neural network and is trained using training dataset derived from historical and current data about a plurality of issues, resolution data associated with a plurality of corrective actions corresponding to the plurality of issues, and a plurality of job logs. Thus, the trained ML model uses the training data to determine the corrective action with corresponding confidence score.

At step 840, the corrective action is performed based on the confidence score. To that end, the corrective action may be provided to a healer robot, such healer robot 550 or healer robot 622, where the healer robot implements the determined corrective action in the at least one robot to resolve the issue. In some embodiments, a plurality of corrective actions with corresponding confidence scores is determined to resolve the issue. Further, the plurality of confidence scores is compared with a threshold confidence score. Based on the comparison one corrective action with confidence score more than the threshold confidence score is determined and is used to resolve the issue. However, if the confidence scores of the plurality of the corrective action is less than the threshold confidence score, a user is alerted about the issue and information of the issue is provided to the user which enables the user to resolve the issue.

In an example embodiment, method 800 of FIG. 8 above includes configuring a computer program associated with a hardware processor configured to execute a series of operations, wherein the series of operations are used to perform all or some of the steps described in in the method 800. The hardware processor may, for example, be configured to execute the series of operations associated with the method 800 by performing hardware implemented logical functions, executing stored instructions, or executing algorithms for performing each of the operations. Alternatively, the apparatus includes means for performing each of the operations described above. In this regard, according to an example embodiment, examples of means for executing the series of operations associated with the method 800 may include, for example, processor 530 which is implemented in system 500 and/or a device or circuit for executing instructions or executing an algorithm for processing information as described above.

In an example embodiment, a robot stops processing due to Auto robot provisioning, for example, a company brought 10 worker robots for tasks that are to be performed in the morning and 10 other worker robots for tasks that are to be performed in the evening. During the morning shift, only 10 worker robots are used and the other 10 worker robots that are reserved for evening tasks are idle. If the load is increased during the morning shift, the healer robot assigns some of the tasks to the worker robots that are reserved for the evening. The assigned evening worker robots can work on the morning task until the reserved evening time arrives. Once, the evening time approaches, the reserved second set of 10 worker robots can work on evening tasks. In such a way, the healer robot can efficiently manage the tasks and completes the tasks in time without any faults.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system for managing one or more robots in a Robotic Process Automation (RPA) environment, the system comprising:
    memory configured to store a trained machine learning (ML) model and one or more computer-executable instructions; and
    at least one processor configured to execute the one or more computer-executable instructions to:
        receive information of an issue associated with at least one robot of the one or more robots;
        obtain job log data for the issue, wherein the job log data is associated with the at least one robot;
        determine, using the trained ML model, a corrective action to be performed on the at least one robot and a corresponding confidence score for resolving the received issue, wherein the determination is based on the job log data; and perform the corrective action on the at least one robot for managing the at least one robot depending on the confidence score.

2. The system of claim 1, wherein the at least one processor is further configured to:

predict, using the trained machine learning model, a potential issue associated with the at least one robot of the one or more robots;

obtain job log data for the predicted potential issue;

analyze, using the trained machine learning model, the obtained job log data; and optimize execution of the at least one robot, based on the analyzed job log data, to prevent the potential issue from occurring.

3. The system of claim 1, wherein the trained machine learning model is trained based on a training dataset comprising data associated with at least a plurality of historical issues, historical resolution data associated with a plurality of corrective actions corresponding to the plurality of historical issues, and a plurality of job logs.

4. The system of claim 1, wherein the at least one processor is further configured to transmit information associated with the issue, the determined corrective action and the corresponding confidence score to a user, and wherein the information associated with the issue comprises: a name of the at least one robot associated with the issue, a process that was running in the at least one robot when the issue occurred, a code associated with the issue, a description of the issue, and historical occurrence data of the issue.

5. The system of claim 1, wherein the system is implemented in at least one of a cloud environment or an on-premises environment.

6. The system of claim 1, wherein the trained machine learning model is a self-learning model.

7. The system of claim 1, wherein the at least one processor is configured to execute the trained machine learning module to predict one or more corrective actions, for the received issue, and wherein the predicted one or more corrective actions are associated with their corresponding confidence scores.

8. The system of claim 1, wherein to perform the corrective action based on the confidence score, the at least one processor is further configured to:

compare the confidence score corresponding to the corrective action with a threshold confidence score; and implement, automatically, the corrective action when the confidence score is more than the threshold confidence score.

9. The system of claim 8, wherein to perform the corrective active action based on the confidence score the at least one processor is further configured to:

compare the confidence scores corresponding to the corrective action with the threshold confidence score;

transmit information associated with the determined corrective action and the corresponding confidence score to a user to approve implementation of the determined corrective action, when the confidence score is more than the threshold confidence score; and implement, automatically, the determined corrective action on receiving approval from the user.

10. The system of claim 8, wherein the at least one processor is configured to alert a user regarding the determined issue when the confidence score corresponding to the corrective action is less than the threshold confidence score.

11. The system of claim 1, wherein to determine the corrective action and the corresponding confidence score, the trained machine learning model is configured to use a conditional random field (CRF) approach.

12. A method for managing one or more robots in a Robotic Process Automation (RPA) environment, the system comprising:

receiving information of an issue associated with at least one robot of the one or more robots;

obtaining job log data for the issue, wherein the job log data is associated with the at least one robot;

determining, using a trained machine learning (ML) model, a corrective action to be performed on the at least one robot and a corresponding confidence score based on the job log data; and performing the corrective action on the at least one robot for managing the on the at least one robot depending on the confidence score.

13. The method of claim 12, wherein the method further comprises:

predicting, using the trained machine learning model, a potential issue associated with the at least one robot of the one or more robots;

obtaining job log data, associated with the at least one robot, for the predicted potential issue;

analyzing, using the trained machine learning model, the obtained job log data; and optimizing execution of the at least one robot, based on the analyzed job log data, to prevent the potential issue from occurring.

14. The method of claim 12, wherein the trained machine learning model is trained based on a training dataset comprising data associated with at least a plurality of historical issues, historical resolution data associated with a plurality of corrective actions corresponding to the plurality of historical issues, and a plurality of job logs.

15. The method of claim 12, wherein the method further comprises transmitting information associated with the issue, the determined corrective action and the corresponding confidence score to a user, and wherein the information associated with the issue comprises: a name of the at least one robot associated with the issue, a process that was running in the at least one robot when the issue occurred, a code associated with the issue, a description of the issue, and historical occurrence data of the issue.

16. The method of claim 12, wherein the trained machine learning model is a self-learning model.

17. The method of claim 12, wherein the method comprises executing the trained machine learning module to predict one or more corrective actions, for the received issue, and wherein the predicted one or more corrective actions are associated with their corresponding confidence scores.

18. The method of claim 12, wherein for performing the corrective action based on the confidence score, the method further comprises:

comparing, the confidence score corresponding to the corrective action with a threshold confidence score; and implementing, automatically, the corrective action when the confidence score is more than the threshold confidence score.

19. The method of claim 18, wherein for performing the corrective active action based on the confidence score, the method further comprises:

comparing the confidence scores corresponding to the corrective action with the threshold confidence score;

transmitting information associated with the determined corrective action and the corresponding confidence score to a user to approve implementation of the determined corrective action, when the confidence score is more than the threshold confidence score; and implementing, automatically, the determined corrective action on receiving approval from the user.

20. A computer program embodied on a non-transitory computer readable medium, the computer program is configured to cause one or more processors to:

receive information of an issue associated with at least one robot;

obtain job log data for the issue associated with the at least one robot;

determine, using a trained machine learning model, a corrective action to be performed on the at least one robot and a corresponding confidence score of the corrective action for resolving the issue based on the obtained job log data; and performing the corrective action on the at least one robot for managing the at least one robot depending on the confidence score.

* * * * *